(12) United States Patent
Lam et al.

(10) Patent No.: US 7,958,211 B2
(45) Date of Patent: Jun. 7, 2011

(54) AUTOMATIC CONFIGURATION OF WIRELESS DEVICE FOR ROUTER

(75) Inventors: Tom Lam, Chula Vista, CA (US); Guoxuan Zhang, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 261 days.

(21) Appl. No.: 11/876,273

(22) Filed: Oct. 22, 2007

(65) Prior Publication Data

US 2009/0103547 A1    Apr. 23, 2009

(51) Int. Cl.
   *G06F 15/177* (2006.01)
(52) U.S. Cl. .... 709/222; 709/228; 370/254; 370/395.53
(58) Field of Classification Search ........... 709/220–222
   See application file for complete search history.

(56) References Cited

U.S. PATENT DOCUMENTS

| | | | |
|---|---|---|---|
| 6,975,857 B2 | 12/2005 | Tourrilhes et al. | |
| 7,103,661 B2 | 9/2006 | Klein | |
| 2003/0037040 A1* | 2/2003 | Beadles et al. | 707/1 |
| 2003/0212773 A1* | 11/2003 | Sullivan | 709/221 |
| 2004/0125744 A1 | 7/2004 | Perrot et al. | |
| 2005/0152287 A1* | 7/2005 | Yokomitsu et al. | 370/255 |
| 2005/0198221 A1 | 9/2005 | Manchester et al. | |
| 2006/0104238 A1 | 5/2006 | Hibino et al. | |
| 2006/0105713 A1 | 5/2006 | Zheng | |
| 2006/0264227 A1* | 11/2006 | Takahashi et al. | 455/513 |
| 2007/0036358 A1* | 2/2007 | Nguyen et al. | 380/270 |

FOREIGN PATENT DOCUMENTS

| | | |
|---|---|---|
| EP | 1553746 | 7/2005 |
| WO | 2005104459 | 3/2005 |
| WO | WO 2005104459 A1 * | 11/2005 |

OTHER PUBLICATIONS

Dual-Band Wireless A+G Broadband Router, Linksys, Copyright 2003, pp. 10, 22, 56-60. http://www.retrevo.com/support/Linksys-WRT55AG-Wireless-Routers-manual/id/421ci072/t/2/.*
NETGEAR, Inc. "Wireless Router Setup Manual" 2006.
Michael Miller. "Wireless Networking with Microsoft Windows Vista Setting Up Your Wireless Network>Connecting Your Main Computer to the Wireless Router". Http://safari.oreilly.com/9780789737014/ch05lev1sec3#ch05lev1sec3. Jul. 7, 2007.
http://www.csun.edu/~andrzej/COM529-S05/presentations/4.ppt.
"How do I setup a wireless network?" http://www.tech-faq.com/setup-wireless-netvvork.shtml, 2007.

* cited by examiner

*Primary Examiner* — Ian N Moore
*Assistant Examiner* — Jackie Zuniga
(74) *Attorney, Agent, or Firm* — John L. Rogitz

(57) ABSTRACT

A user of a wireless device connects a cable to a router and is given the option of manually or automatically creating a user profile to configure the wireless device for subsequent wireless communication with the router when the user removes the cable.

10 Claims, 6 Drawing Sheets

Main Menu

AUTOMATIC CONFIGURATION OF WIRELESS DEVICE FOR ROUTER

I. FIELD OF THE INVENTION

The present invention relates generally to automatically configuring wireless devices such as notebook computers for communicating with wireless routers.

II. BACKGROUND OF THE INVENTION

Wireless computers typically communicate with wireless networks and ultimately the Internet through so-called network access points. Such access points are often referred to as "routers" because they route wireless communication from the wireless computers to the wired backbone of the Internet.

To achieve wireless communication with a router, a wireless computer must be properly configured with certain parameters, including the network name of the router, its passcode which, e.g., represents an encryption key, and the type of encryption used by the router. These parameters are entered by hand by the user of the wireless computer, a tiresome chore as recognized herein.

SUMMARY OF THE INVENTION

A wireless computer has a processor that executes logic to prompt a user to establish a wired communication path with a wireless router. The logic gives the user a choice of automatic configuration of the wireless device for wireless communication with the router, and if the user selects automatic configuration, a user profile is automatically established for the computer.

In non-limiting implementations the wired communication path may be an Ethernet path and the computer can be a notebook computer. If desired, if the user selects automatic configuration, the user profile for the computer can be established by using the wired communication path to automatically ascertain a network name (such as an SSID) associated with the router and establish the network name as the network name associated with the computer. Other router parameters that can be ascertained and set in the computer include passcode and encryption type.

In another aspect, a computer readable medium is usable by a processor to execute logic including instructing a user of a computer to establish a wired communication path with a router, and automatically using the wired communication path to cause at least a network name, passcode, and encryption type associated with the router to be communicated to the computer. The logic may also include subsequently using the network name, passcode, and encryption type for wireless communication between the router and computer.

In still another aspect, a user of a computer is instructed to establish wired communication with a network node. In response to a user signal to automatically configure the computer, at least a network name and encryption type ate downloaded from the network node. The network name and encryption type are used for wireless communication between the computer and network node.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
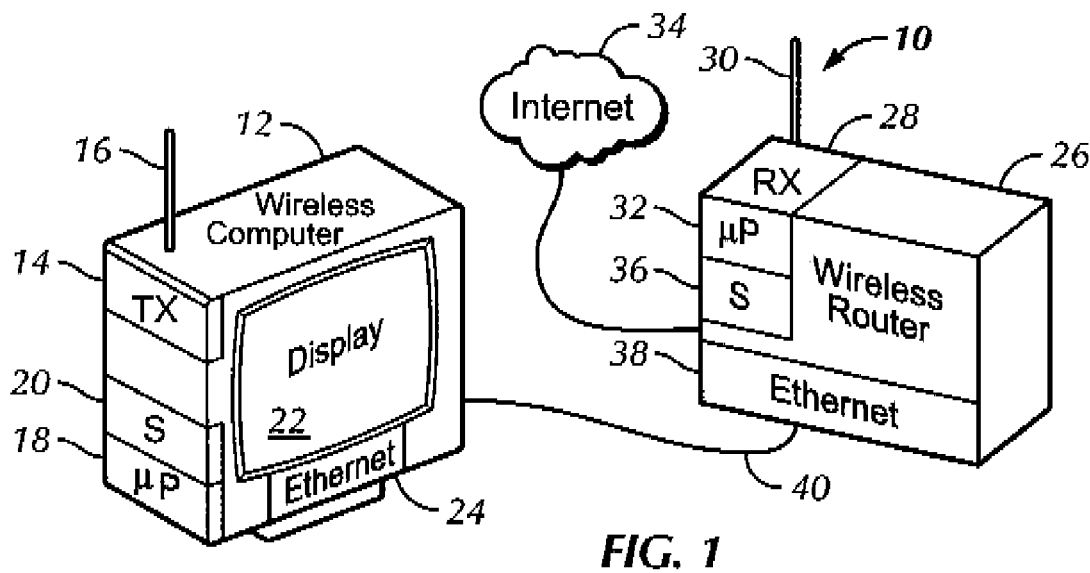
FIG. 1 is a block diagram of a non-limiting system in accordance with present principles.

Referring initially to FIG. 1, a system is shown, generally designated 10, that includes a wireless device 12 such as but not limited to a notebook computer with wireless communication capability, such as but not limited short-range infrared or radiofrequency (e.g., Bluetooth) wireless communication and/or longer range wireless communication capability such as GSM, code division multiple access (CDMA), wideband CDMA (W-CDMA), time division multiple access (TDMA), orthogonal frequency division multiplexing (OFDM), etc. Accordingly, the device 12 includes a wireless transceiver 14 with associated antenna 16, and the transceiver 14 communicates with a device processor 18 that may access a computer readable medium 20 such as volatile or non-volatile solid state storage, disk storage, tape storage, or other type of electronic storage medium or logic circuitry that typically can be executed by the processor 18 to, e.g., undertake the present logic.

The processor 18 may control a display 22 such as a computer monitor. Also, the processor 18 can communicate with a wired communication interface 24 such as an Ethernet interface, it being understood that other types of wired interfaces such as universal serial bus (USB) interfaces may be used.

In the embodiment shown in FIG. 1, the wireless device 12 may communicate with a network node such as a wireless router 26. The wireless router 26 typically includes a wireless transceiver 28 with associated antenna 30 for wireless communication with the transceiver 14 of the wireless device 12. Also, the router 26 typically includes a router processor 32 that can communicate with the Internet 34. The router processor 32 can access a computer readable medium 36, as well as a wired communication interface such as an Ethernet interface 38. A wired communication path 40 may be established between the device 12 and router 26 by, e.g., an Ethernet cable, for purposes to be shortly disclosed.

Figure 2:
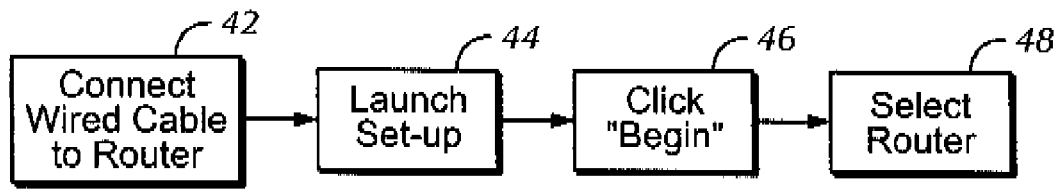
FIG. 2 is a flow chart of the user actions in non-limiting implementations.
Figure 5:
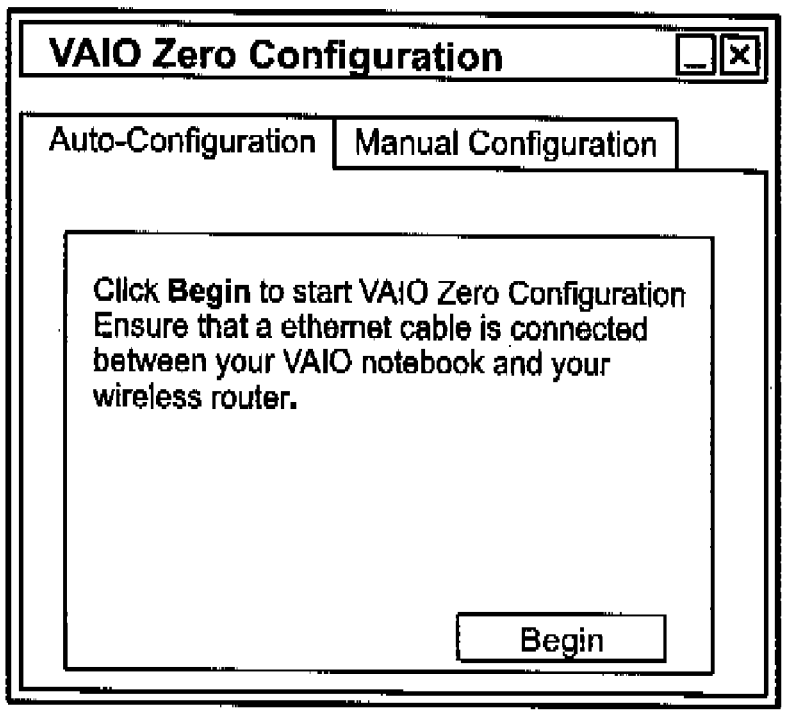
FIG. 5 is a screen shot of the automatic configuration user interface screen.

Referring now to FIG. 2, at block 42 upon, e.g., initial start up the device processor 18 displays an instruction on the display 22 for the user to establish the wired communication path 40 to the router 26. When this is accomplished a set-up program is launched by the processor 18 which causes a screen shot to be displayed on the display 22, from which the user can select to "begin" the configuration process as set forth further below. If desired, the user may be presented with a list of wireless routers detected nearby the device 12 from which to select one at block 48. An example screen shot is shown in FIG. 5, which presents an instruction to establish the wired communication path 40 and which also presents the "begin" button from an "auto config" menu as shown.

Figure 3:
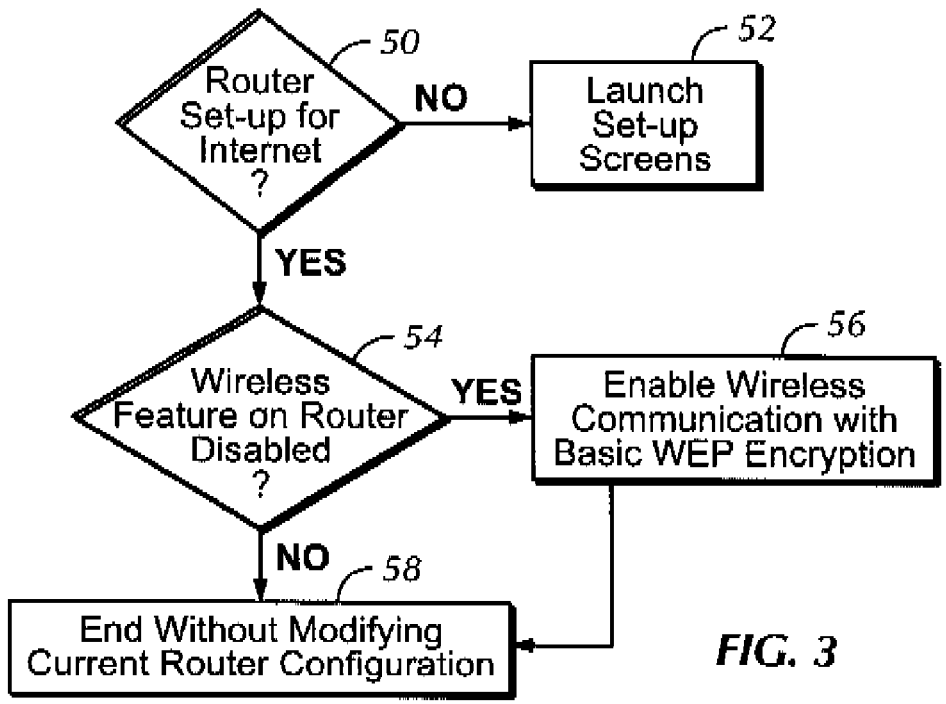
FIG. 3 is a flow chart of example logic executed by the wireless device.

After configuring the device 12 in accordance with disclosure below for wireless communication with the router 26 and prior to disconnecting the cable establishing the wired path 40, FIG. 3 shows that the device processor 18 can facilitate limited router 26 set-up using the device 12 if desired. Commencing at decision diamond 50, it is determined whether the router 26 is set up for communicating with the Internet 34. If not, the set-up screens of the router 26 can be communicated to the device processor 18 and launched for the user to manipulated in setting up the router for Internet communication in accordance with principles known in the art.

If the router is set up for the Internet the logic can move to decision diamond 54 to determine whether the wireless communication feature of the router 26 is disabled. If it is disabled the device processor 18 can, at block 56, enable the router 26 for wireless communication preferably using basic wireless encryption protocol (WEP). After enabling wireless communication of the router 26 the logic ends at state 58 without modifying any other parameters of the current router 26 configuration.

Figure 4:
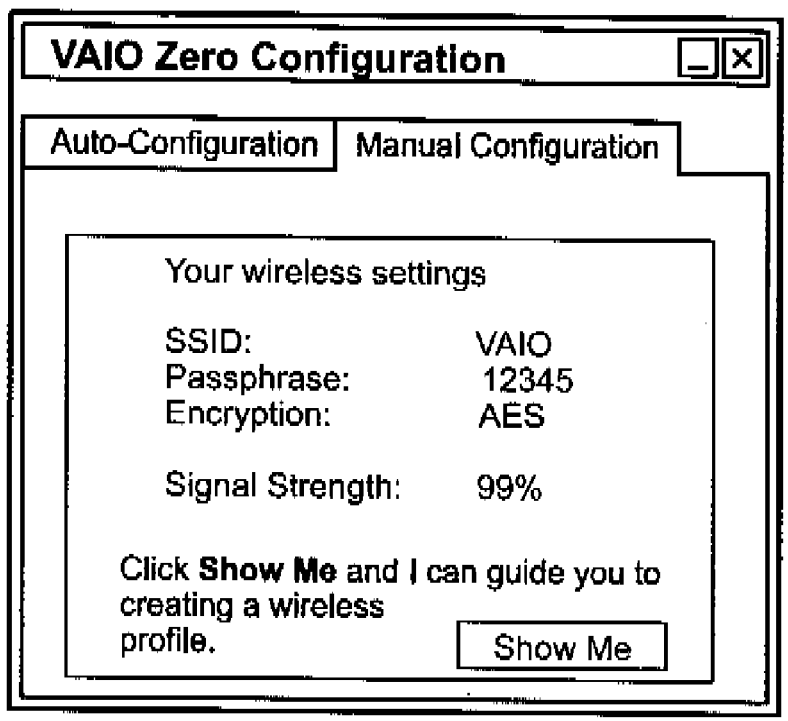
FIG. 4 is a screen shot of the manual configuration user interface introductory screen.
Figure 6:
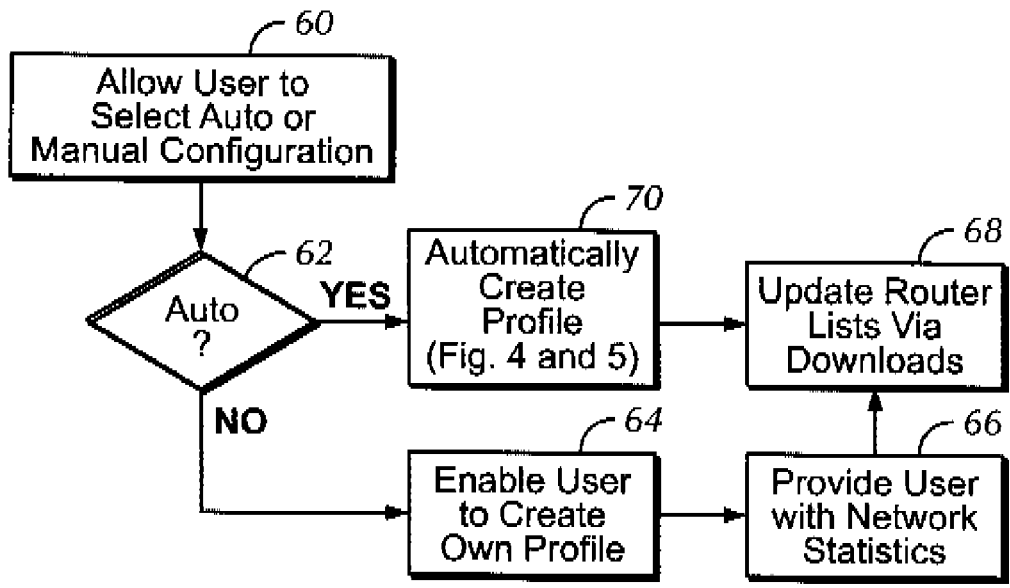
FIG. 6 is a flow chart of the logic for selecting the screens shown in FIGS. 4 and 5.

FIG. 6 shows that at block 60, the user can be given the option of automatically or manually establishing a profile, essentially a wireless communication configuration, for the device 12. This choice can be made by clicking on the "Manual configuration" tab or a screen shot as shown in FIG. 4, in which case the current network name (e.g., service set identifier or "SSID"), current passcode or passphrase, and current encryption type are displayed, it being understood that default values typically are initially displayed and the user can change the values to the desired values. Network statistics such as signal strength as shown in FIG. 4 can also be displayed. An assist button such as the button labeled "show me" in FIG. 4 may also be displayed to assist the user to navigate through a programmed sequence of setup steps.

On the other hand, the user may elect to execute wireless setup automatically by selecting the "auto configuration" tab as shown in FIG. 5 and then entering a signal (by, e.g., clicking a "begin" button as shown) to automatically configure the wireless device 12 for wireless communication with the router 26 without further user interaction required. In this way, a "user profile" is automatically established in the device 12.

This choice is depicted by decision diamond 62 in FIG. 6, wherein if the user elects manual configuration, the user is permitted to manually configure the wireless device 12 at block 64, and be provided with updated network statistics if desired at block 66. Once wireless communication configuration has been completed, at block 68 updated lists of available routers may be provided from time to time via downloads.

On the other hand, if the user selects automatic configuration by, e.g., clicking on the "begin" button in FIG. 5, the logic moves to block 70 to automatically configure the device 12 for wireless communication with the router 26, thus creating a "user profile" for the device 12.

In one non-limiting implementation, this automatic configuration is executed by the device processor 18 by accessing the router 26 through the wired path 40 to retrieve the network name, passcode, and encryption type (e.g., AES, 40/64 bits WEP, 104/128 bits WEP, or WPA-PSK) of the router 26. These parameters are entered into the device 12 as the network name, passcode, and encryption type of the device 12, thereby minimally configuring the device 12 for wireless communication with the router 26 by matching these parameters with those of the router 26. Thereafter, the wired path 40 may be removed and the wireless device 12 can communicate wirelessly with the router 26.

Additionally, if desired, the following parameters may also be established in the wireless device 12: extended range, e.g., transmit power level (watts); power save mode such as continuously aware mode (CAM) (enabled and disabled); more detailed security parameters such as whether to use open system or shared key (open system typically is set as the default); data encryption key type, e.g., ASCII (Alphanumeric), HEX (Hexadecimal), etc. Additionally, wireless mode, also known as transmit rate typically in frequency (GHz) and data rate (Mbps) can be set to match the same parameter in the router 26.

Figure 7:
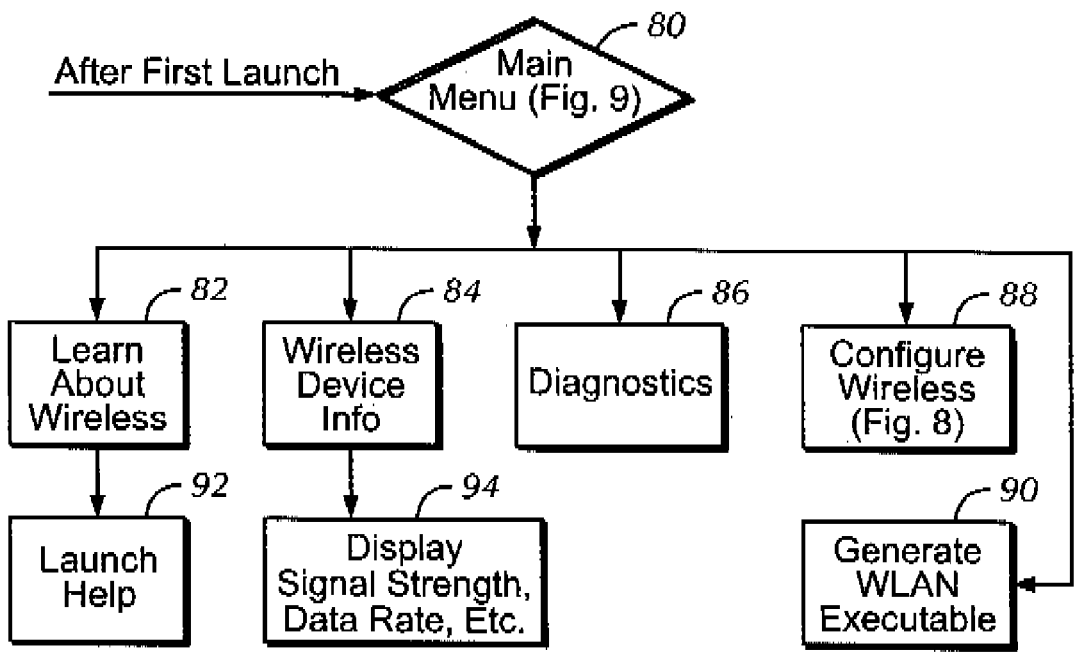
FIGS. 7 and 8 show alternate, preferred, non-limiting logic that can be used.
Figure 9:
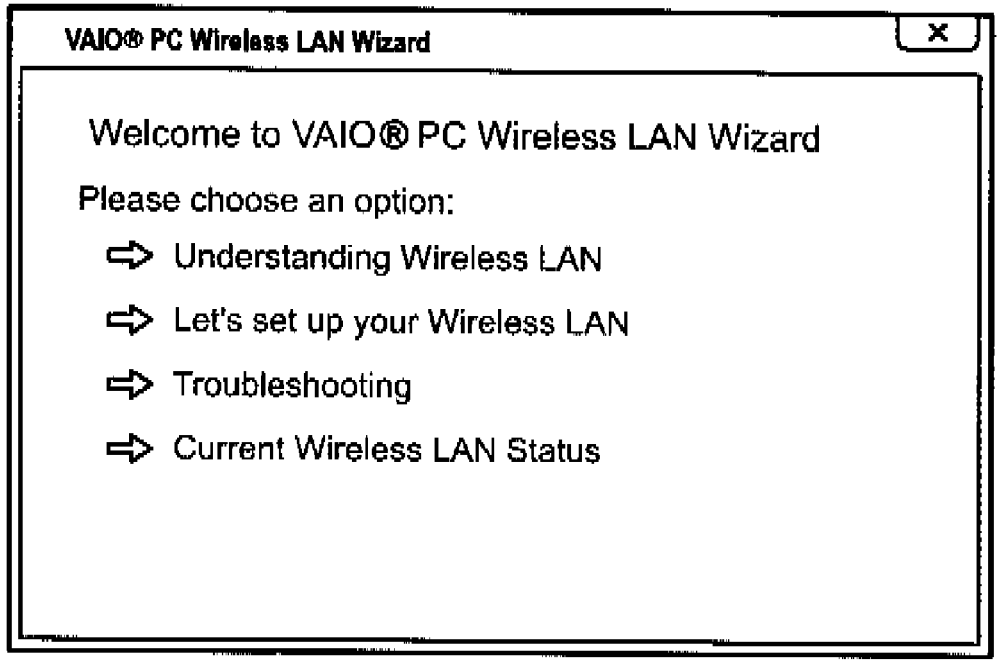
FIGS. 9-11 show screen shots related to the logic of FIGS. 7 and 8.

FIG. 7 shows that after first launch a main menu may be displayed at decision diamond 80 which presents up to five selections that can be selected by a user. An example main menu is shown in FIG. 9, it being understood that FIG. 9 uses different expressions for the same selections than does FIG. 7.

As shown, a selection button 82 is presented that can be selected by a user by appropriately manipulating an input device such as a mouse to learn more about the wireless system. Also, a wireless device information button 84 is presented that may be selected to access information on the device, and a diagnostics button 86 is presented that may be selected to troubleshoot problems being encountered by the user. A configuration button 88 may also be provided that can be selected to invoke the logic of FIG. 8. Also, a "generate WLAN executable" button 90 may be presented in the case where the user previously selected automatic router configuration.

A help utility button 92 may be presented in response to selection of the button 82 as shown to launch a help utility. Also, a display pane 94 of certain wireless parameters such as signal strength and data transmission rate may be presented in response to selection of the information button 84.

Figure 8:
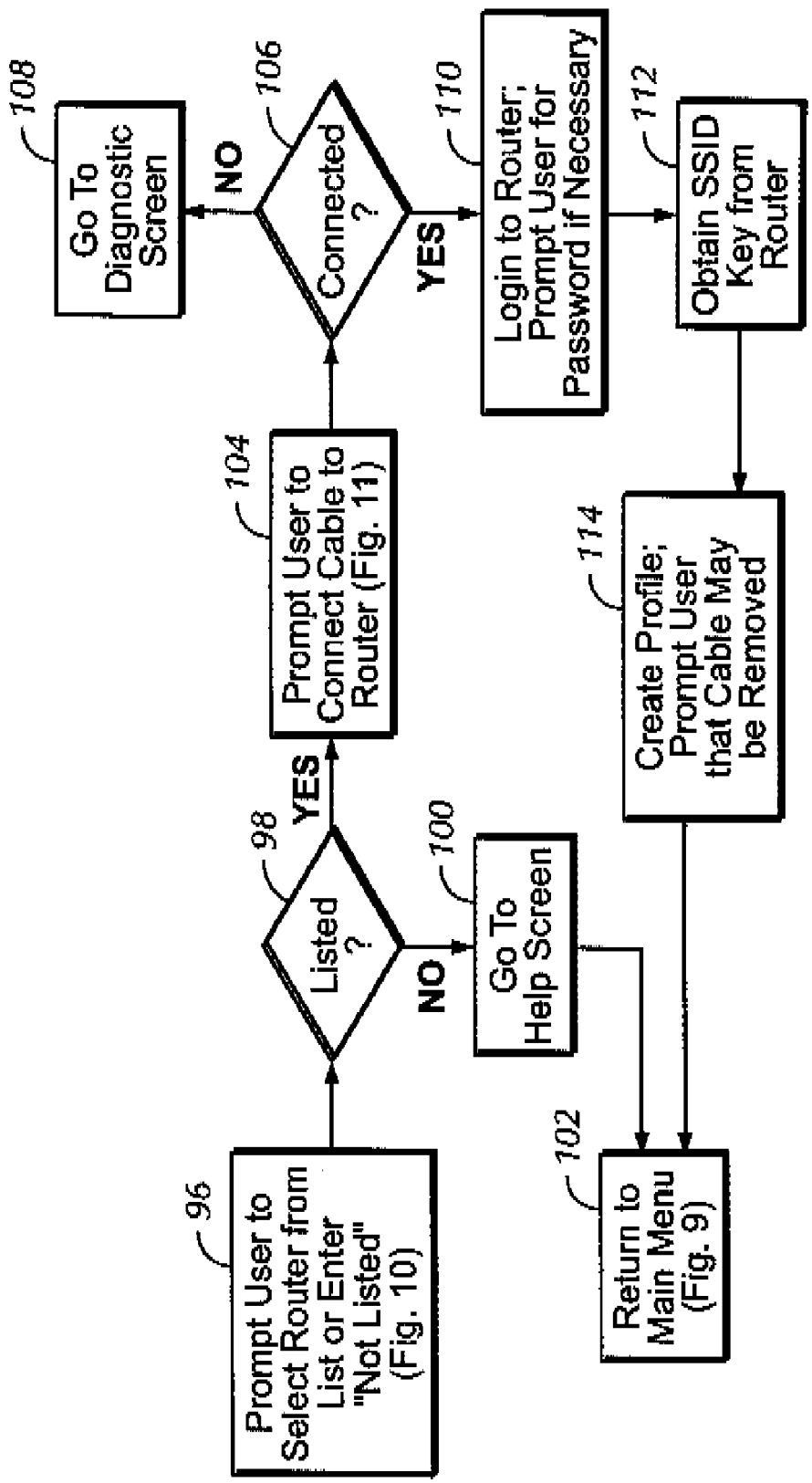
Figure 10:
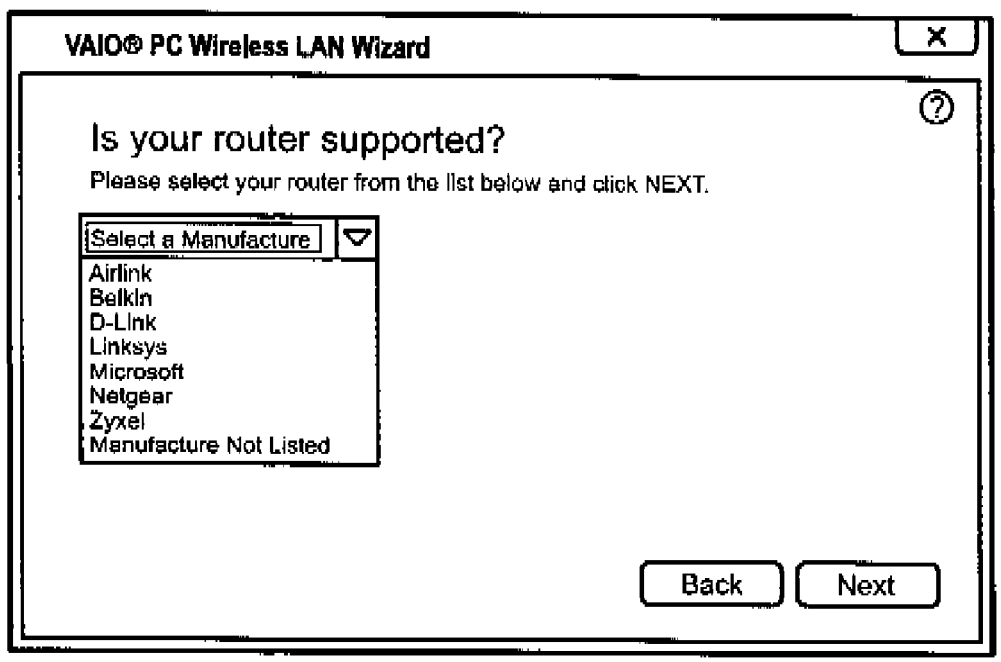

FIG. 8 shows non-limiting preferred logic for executing the overall method discussed previously. Commencing at block 96, a screen is displayed on the user's wireless device prompting the user to select a router from a list, or to select "not listed". A non-limiting example of such a screen is shown in FIG. 10. If the user indicates at decision diamond 98 that the router is not listed, a help screen can be presented at block 100, and when the user exits the help screen the main menu may be presented at block 102.

Figure 11:
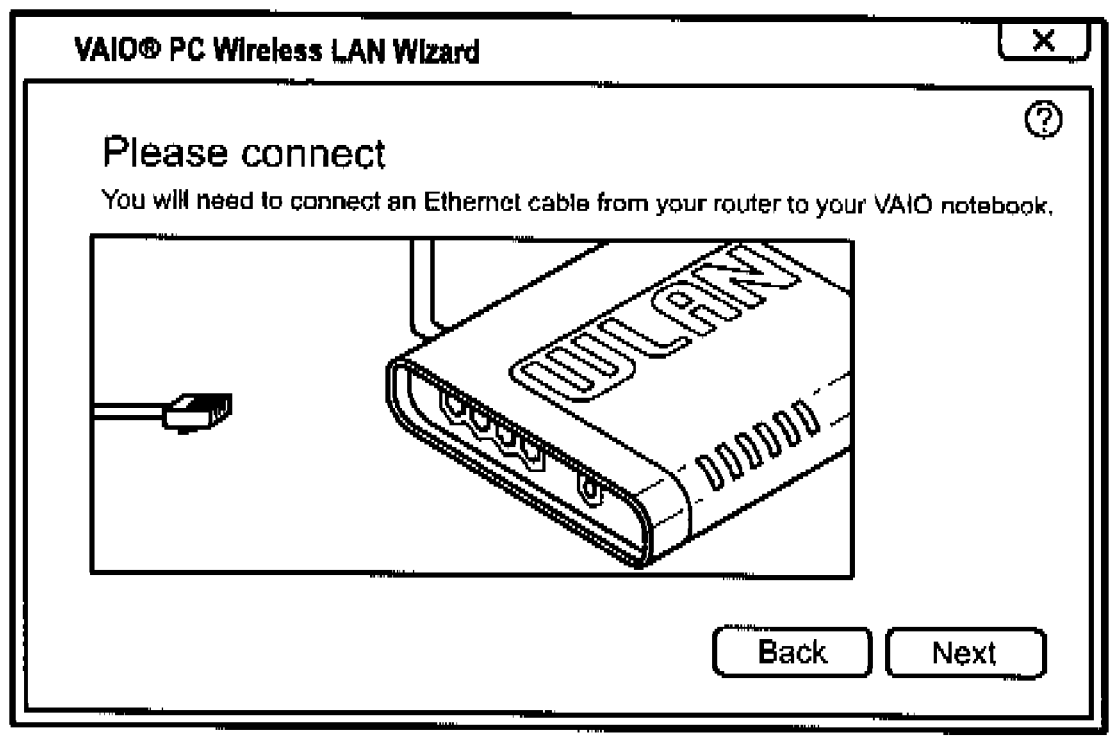

In contrast, if the user selects a router from the list, the user is prompted to connect the above-discussed cable to the router at block 104. An example prompt screen is shown in FIG. 11.

If, at decision diamond 106, the logic of the wireless device does not detect a cable connection or an Internet connection, a diagnostic screen is presented at block 108. On the other hand, upon making the proper connections the logic moves to block 110 to log in to the router (if necessary, asking the user to input a router password). At block 112, the SSID and network key are automatically obtained from the router over the cable as described above, and a wireless profile created at block 114 in accordance with above principles. The main menu may be presented subsequently at block 102.

While the particular AUTOMATIC CONFIGURATION OF WIRELESS DEVICE FOR ROUTER is herein shown and described in detail, it is to be understood that the subject matter which is encompassed by the present invention is limited only by the claims.

What is claimed is:
1. A computer, comprising:
a processor executing logic comprising:
prompting, on a display controlled by the processor, a user to establish a wired communication path with a wireless router;

giving the user a choice of automatic configuration of the computer for wireless communication with the router at least in part by presenting a user interface on the computer including a first selector element indicating a manual configuration procedure and a second selector element indicating an automatic configuration procedure, wherein in response to the first selector element being selected the computer executes the manual configuration procedure including presenting to the user at least a default network name, the processor in response to receiving user input representing a new network name replacing the default network name with the new network name as part of the manual configuration procedure, wherein in response to the second selector element being selected the computer executes the automatic configuration procedure in which the computer automatically establishes a user profile for the computer, the user profile including a network name automatically retrieved by the processor from the router over the wired communication path, wherein if the user selects automatic configuration, the user profile for the computer is established at least in part by using the wired communication path to automatically ascertain a passcode of the router and establish the passcode as the passcode of the computer.

2. The computer of claim 1, wherein the wired communication path is an Ethernet path.

3. The computer of claim 2, wherein the computer is a notebook computer.

4. The computer of claim 1, wherein the network name is a service set identifier (SSID).

5. The computer of claim 1, wherein if the user selects automatic configuration, the user profile for the computer is established at least in part by using the wired communication path to automatically ascertain an encryption type of the router and establish the encryption type as the encryption type of the computer.

6. A non-transitory computer readable medium usable by a processor to execute logic comprising:
   instructing a user of a computer to establish a wired communication path with a router;
   giving the user a choice of automatic configuration of the computer for wireless communication with the router at least in part by presenting a user interface on the computer including a first selector element indicating a manual configuration procedure and a second selector element indicating an automatic configuration procedure;
   responsive to selection of the second selector element, automatically using the wired communication path to cause at least a network name, passcode, and encryption type associated with the router to be communicated to the computer; and
   subsequently using the network name, passcode, and encryption type for wireless communication between the router and computer, the following parameters also being established in the computer: transmit power level (watts); power save mode; security parameters including whether to use open system or shared key, with open system being set as a default; data encryption key type; and transmit rate frequency (GHz) and data rate (Mbps) set to match a transmit rate frequency and data rate.

7. The medium of claim 6, wherein the automatically using logic is invoked when a user enters a signal into the computer to automatically configure the computer.

8. The medium of claim 6, wherein the network name is a service set identifier (SSID).

9. The medium of claim 6, wherein the wired communication path is an Ethernet path.

10. The medium of claim 6, wherein the computer is a notebook computer.

* * * * *